United States Patent
Furukawa et al.

(10) Patent No.: US 9,395,706 B2
(45) Date of Patent: Jul. 19, 2016

(54) NOISE DETERMINATION DEVICE

(71) Applicant: MITSUBISHI ELECTRIC CORPORATION, Tokyo (JP)

(72) Inventors: Tomoya Furukawa, Tokyo (JP); Kengo Kato, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/766,782

(22) PCT Filed: Apr. 4, 2013

(86) PCT No.: PCT/JP2013/060358
§ 371 (c)(1),
(2) Date: Aug. 10, 2015

(87) PCT Pub. No.: WO2014/162564
PCT Pub. Date: Oct. 9, 2014

(65) Prior Publication Data
US 2016/0004227 A1    Jan. 7, 2016

(51) Int. Cl.
*H04B 15/00* (2006.01)
*G05B 13/02* (2006.01)

(52) U.S. Cl.
CPC .................. *G05B 13/0225* (2013.01)

(58) Field of Classification Search
CPC .. G06F 3/0418; G09G 2330/06; G01R 27/28; H04B 3/46
See application file for complete search history.

(56) References Cited

U.S. PATENT DOCUMENTS

| 5,029,118 A | 7/1991 | Nakajima et al. |
| 5,487,310 A | 1/1996 | Higuchi |
| 7,519,329 B2 * | 4/2009 | Qi .................. H04B 1/1027 375/226 |

FOREIGN PATENT DOCUMENTS

| JP | 62-114320 A | 5/1987 |
| JP | 62-132435 A | 6/1987 |
| JP | 3-254254 A | 11/1991 |
| JP | 4-175917 A | 6/1992 |
| JP | 7-27581 A | 1/1995 |

(Continued)

OTHER PUBLICATIONS

Japanese Office Action for Refusal for Japanese Patent Application No. 2013-544608, dated Nov. 19, 2013.

(Continued)

*Primary Examiner* — Elias Desta
(74) *Attorney, Agent, or Firm* — Sughrue Mion, PLLC; Richard C. Turner

(57) ABSTRACT

A noise determination device is provided that determines the presence of noise on an input signal with a constant value that is output from an external device. The noise determination device includes a sampling unit that performs three samplings on the input signal, a sampling-interval setting unit that sets an interval between a first one and a second one of the samplings to have a value that is different from an integral multiple of the period of the periodic noise, and sets an interval between the second one and a third one of the samplings to be equal to or larger than an interval that is large enough to fully attenuate the periodic noise, and a noise determination unit that determines that the noise is not superimposed on the input signal only when all values acquired by the first, second, and third samplings match one another.

5 Claims, 7 Drawing Sheets

(56) References Cited

FOREIGN PATENT DOCUMENTS

| JP | 10-91355 A | 4/1998 |
| JP | 2002-310728 A | 10/2002 |
| JP | 2006-270416 A | 10/2006 |
| JP | 2009-217539 A | 9/2009 |

OTHER PUBLICATIONS

International Search Report of PCT/JP2013/060358, dated May 7, 2013. [PCT/ISA/210].

* cited by examiner

NOISE DETERMINATION DEVICE

CROSS REFERENCE TO RELATED APPLICATIONS

This application is a National Stage of International Application No. PCT/JP2013/060358 filed Apr. 4, 2013, the contents of all of which are incorporated herein by reference in their entirety.

FIELD

The present invention relates to a noise determination device that determines the presence of noise.

BACKGROUND

With regard to electronic devices, for example, a digital I/O unit in a sequencer system (a programmable controller) is a unit that primarily causes, for example, an input unit to transmit a signal received from an input device to a CPU unit, and an output unit to output a signal on which input/output processing has been performed in the CPU unit to an output device. In such a unit, stability of input data is important. However, when operated in an environment where noise is generated, there is a possibility of a phenomenon such that unit operations are affected, such as the occurrence of erroneous input ascribed to the effect of the noise.

As a countermeasure against noise that affects on input data, there has been proposed a technique to filter input data. In this case, the input data is sampled. If the sampled values consecutively have the same value for a predetermined number of times, then the input date is defined (see, for example, Patent Literature 1).

However, depending on the environment where devices are used, noise is generated to have a constant periodicity, for example, in places around a device having a driving motor. According to the technique described above, the timing (hereinafter, "sampling") of which date is read has a constant interval in multiple reading operations. Thus, there is a possibility of erroneous input if the period of noise and the sampling timing match each other.

CITATION LIST

Patent Literature

Patent Literature 1: Japanese Patent Application Laid-open No. 2009-217539

SUMMARY

Technical Problem

In order to effectively remove such noise as described above, there is a method of increasing the number of times of samplings so as to read a larger volume of data. However, when the number of times of samplings is increased, the load put on a CPU also increases, and thus there is a problem in that not only determination speed for determining the presence of noise but also the data processing speed of the entire system becomes slower.

The present invention has been achieved in view of the above problem, and an object of the present invention is to provide a noise determination device that can detect the presence of the effects of noise with a lower number of times of samplings even in an environment where periodic noise is generated, and thus the risk of erroneous input can be reduced.

Solution to Problem

According to an aspect of the present invention in order to solve the above mentioned problems and achieve the objects, there is provided a noise determination device that determines, in an environment where periodic noise is generated, presence of noise on an input signal having a constant value that is output from an external device, the noise determination device including: a sampling unit that performs three samplings on the input signal; a sampling-interval setting unit that sets an interval between a first one and a second one of the samplings to have a value that is different from an integral multiple of a period of the periodic noise, and sets an interval between the second one and a third one of the samplings to be equal to or larger than an interval that is large enough to fully attenuate the periodic noise; and a noise determination unit that determines that the noise is not superimposed on the input signal only when all values acquired by the first, second, and third samplings match one another.

Advantageous Effects of Invention

The noise determination device according to the present invention can detect the presence of the effects of noise with a lower number of times of samplings even in an environment where periodic noise is generated, and it can reduce the risk of erroneous input. Furthermore, the noise determination device according to the present invention does not require any special circuit for noise removal, and operations can be handled with slight changes in a circuit, an F/W, and the like. Thus the present invention can be realized at a low cost.

DESCRIPTION OF EMBODIMENTS

Exemplary embodiments of a noise determination device according to the present invention will now be explained in detail with reference to the accompanying drawings. The present invention is not limited to the embodiments.

First Embodiment

Figure 1:
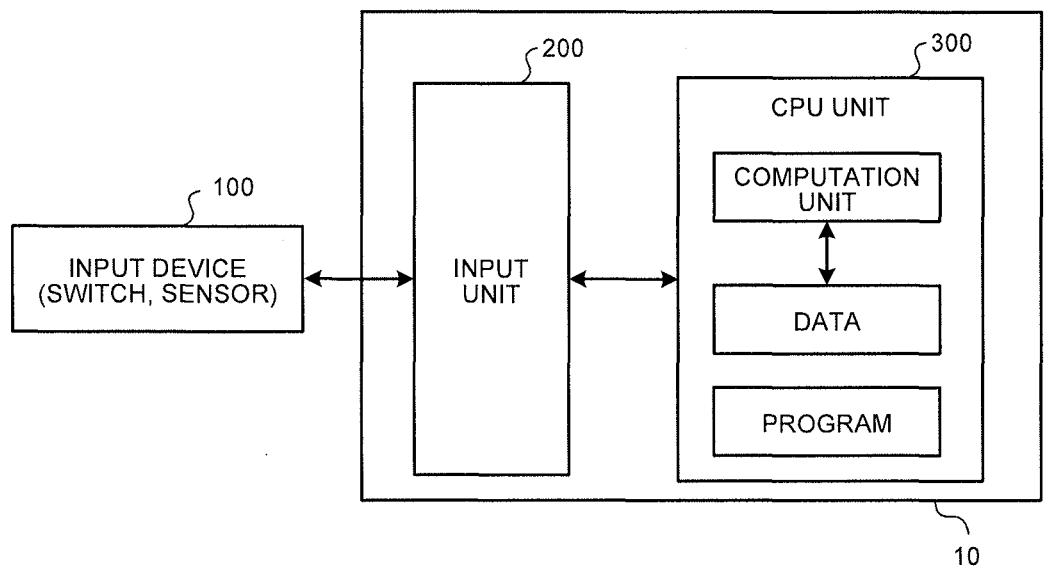
FIG. 1 is a diagram illustrating a configuration of a programmable controller according to an embodiment.

FIG. 1 is a diagram illustrating a configuration of a programmable controller 10 according to a first embodiment of the present invention as an example of a sequencer system.

The programmable controller 10 is connected to an input device 100 (external device) such as a switch or a sensor. The programmable controller 10 includes an input unit 200 that receives an input signal and a CPU unit 300 as a noise determination device where data processing is performed. Generally, noise may be superimposed on an input signal from the input unit 200. Usually, the noise may be periodic noise. Even in a state where an input signal from the input device 100 maintains a constant value, data processing is not performed on the data of the input signal when determined that noise is superimposed on the input signal. Therefore, it is necessary to determine whether noise is superimposed on the input signal.

Figure 2:
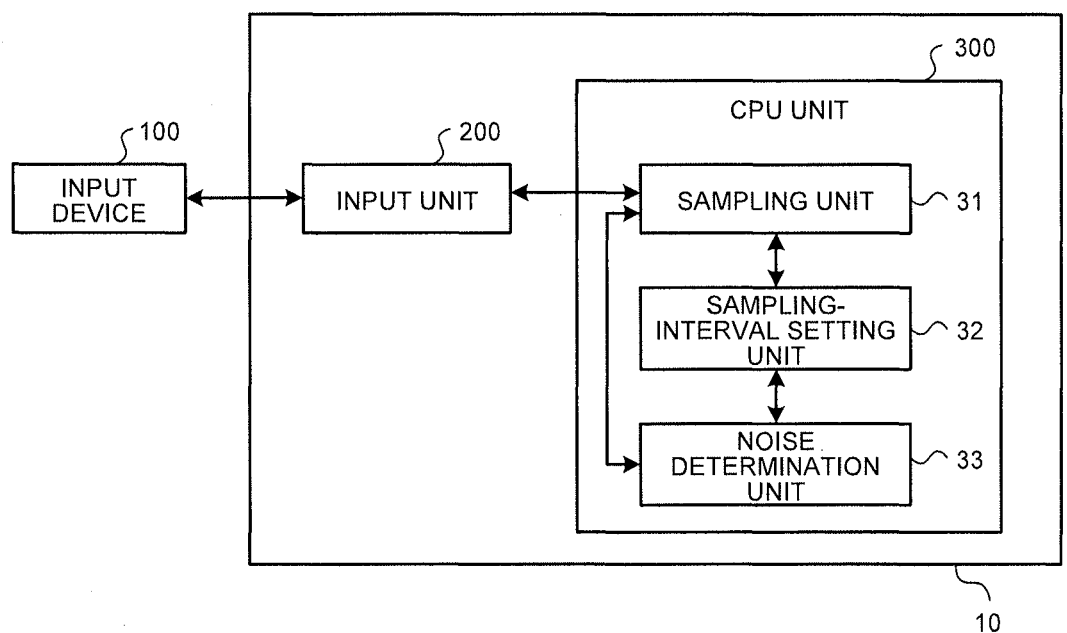
FIG. 2 is a diagram illustrating a configuration of the programmable controller according to the embodiment.

FIG. 2 is a diagram illustrating a configuration of the programmable controller 10 according to the present embodiment, where functions performed by the CPU unit 300 are illustrated as functional blocks. A sampling unit 31 samples an input signal from the input unit 200 with a sampling interval. The sampling interval is set by a sampling-interval setting unit 32. The sampling-interval setting unit 32 sets a sampling interval using a method described later. Using a method described later, a noise determination unit 33 determines based on such a value of an input signal as acquired by the sampling unit 31 whether noise is superimposed on an input signal.

Figure 3:
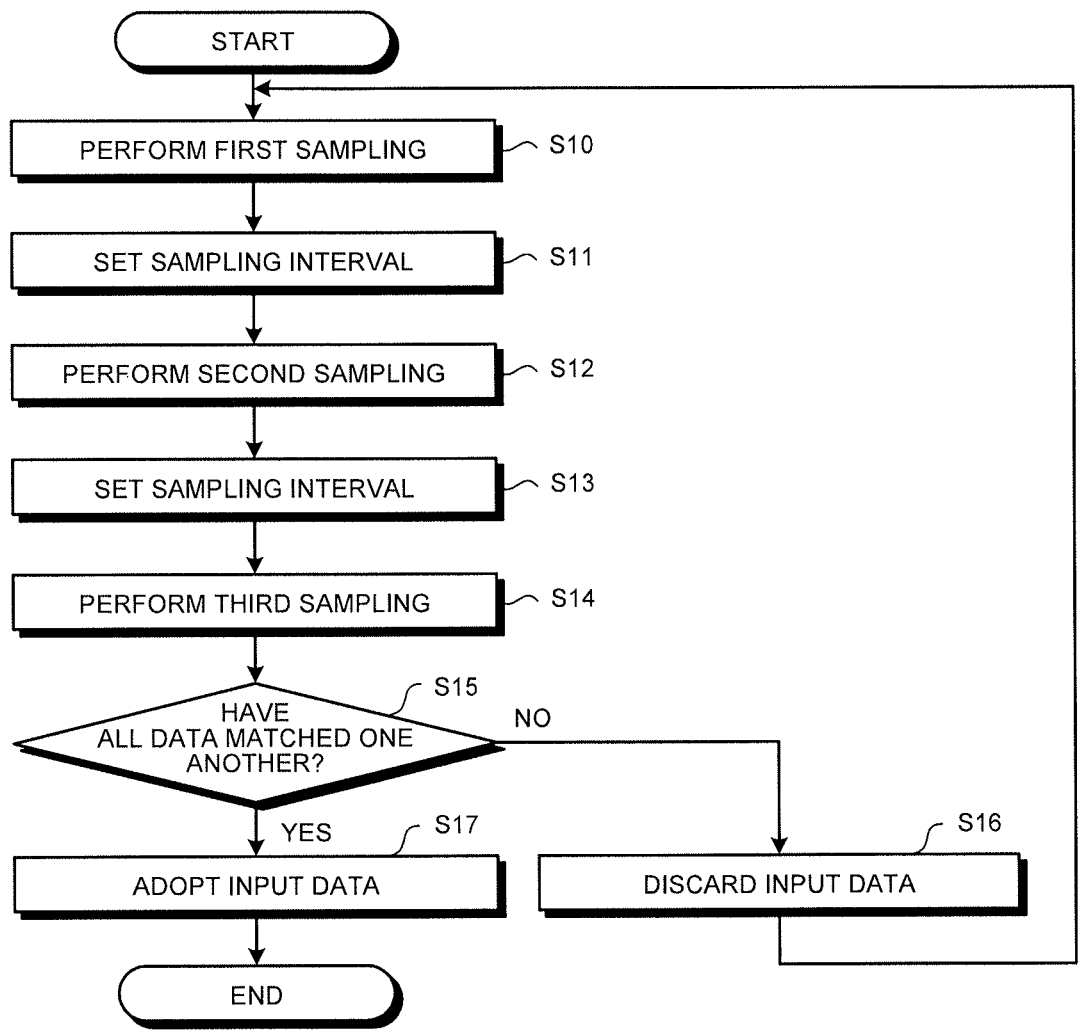
FIG. 3 is a flowchart illustrating a processing flow of a CPU unit according to a first embodiment.

The present embodiment describes a case that the programmable controller 10 is provided in an environment where the period of periodic noise to be superimposed on an input signal can be predicted, and the period is known in advance. A flow of processing performed by the CPU unit 300 according to the present embodiment is illustrated in a flowchart of FIG. 3.

First, the sampling unit 31 performs a first sampling (Step S10). To simplify the descriptions, it is assumed that the timing of the first sampling is at a peak of periodic noise. The sampling-interval setting unit 32 sets a sampling interval so that a second sampling is performed at a timing when effects of the noise become a minimum (Step S11), and the second sampling is performed (Step S12). Specifically, as indicated by sampling examples 1 and 2 of the present embodiment illustrated in FIG. 4, the interval between the first and second samplings is set to have a value different from an integral multiple of a period T of the periodic noise.

Figure 5:
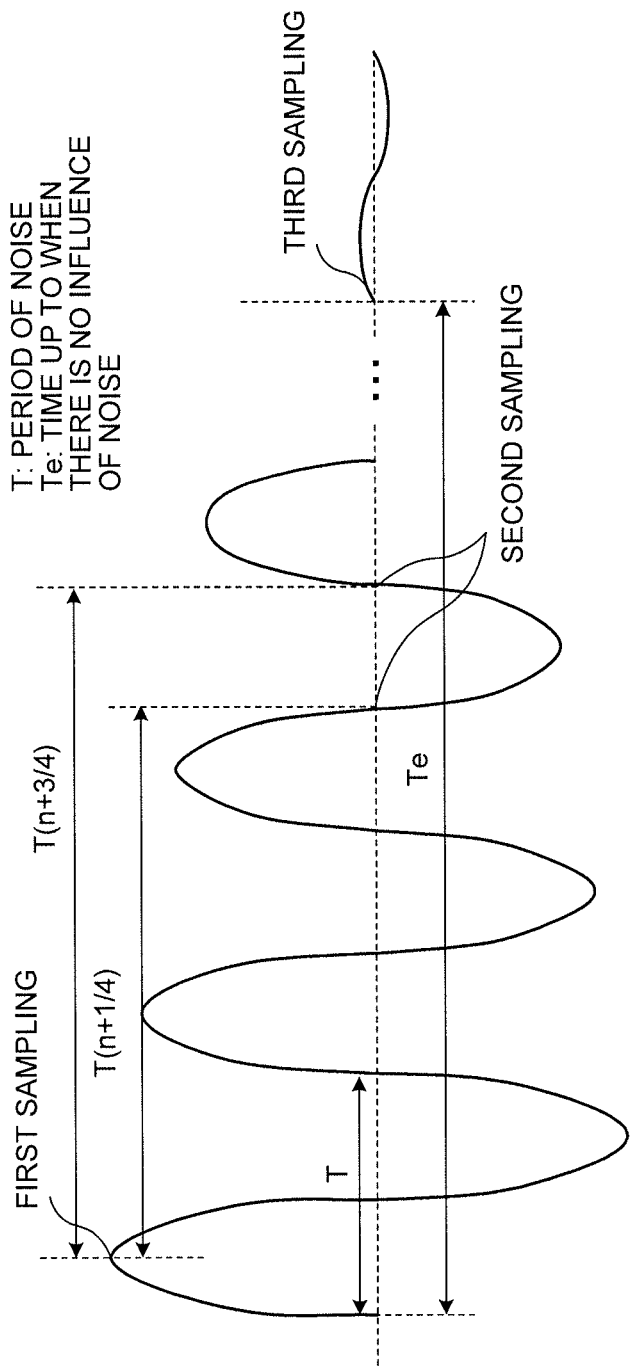
FIG. 5 is a diagram illustrating a sampling example in the first embodiment.

For example, as illustrated in FIG. 5, the interval between the first and second samplings is set to have a value of $T(n+¼)$ or $T(n+¾)$ where n is an integer. For example, if the timing of the first sampling matches the timing of the peak of periodic noise, the noise at the second sampling is zero. Even when the timing of the first sampling is not at the timing of the peak of the periodic noise, setting the interval between the first and second samplings so as to have a value different from an integral multiple of the period T may increase the probability that the values at the first and second samplings are different from each other in an environment where periodic noise is superimposed.

Figure 4:
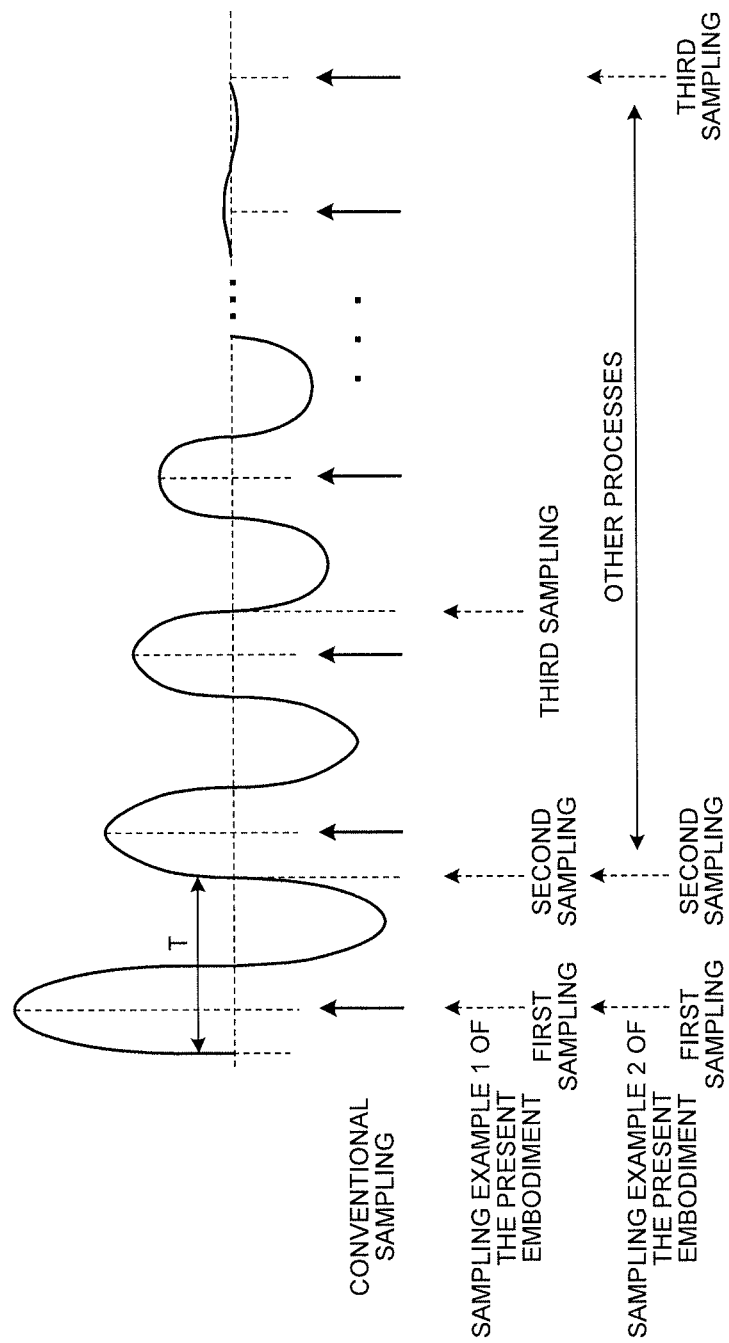
FIG. 4 is a diagram illustrating a sampling example in the first embodiment as compared to a conventional sampling.

As indicated by a conventional sampling example illustrated in FIG. 4, if samplings are performed with a constant interval, the interval may match the period T of periodic noise. In such a case, it is required to increase the number of samplings in order to determine whether any noise is present. Thus, a processing time is also increased. On the other hand, according to the present embodiment, the presence of periodic noise can be determined with a lower number of times of samplings.

After the second sampling, the sampling-interval setting unit 32 sets an interval between the second sampling and a third sampling (Step S13), and the third sampling is performed (Step S14). Similar to the interval between the first and third samplings, the interval between the second and third samplings are also set to have a value different from an integral multiple of the period T of periodic noise, such as $T(m+¼)$ or $T(m+¾)$ (m is an integer). When the interval between the first and second samplings is set to have a value of $T(n+¼)$, the interval between the first and third samplings is set to have a value of $T(m+¾)$. When the interval between the first and second samplings is set to have a value of $T(n+¾)$, the interval between the first and third samplings is set to have a value of $T(m+¼)$. In this way, it is preferable to select the intervals so as to have a different phase. In this manner, sampling intervals having a different phase are selected for the second and third samplings, and thus the determination of the presence of periodic noise can be facilitated.

Alternatively, as illustrated in FIG. 5, the third sampling can be performed with a certain time period until the periodic noise is fully attenuated and there is no effect of noise on the input signal. As indicated by the sampling example 2 of the present embodiment illustrated in FIG. 4, if the interval between the second and third samplings is extended as described above, the CPU unit 300 can be used for other processes during the interval since the sampling is not performed during the interval.

Figure 6:
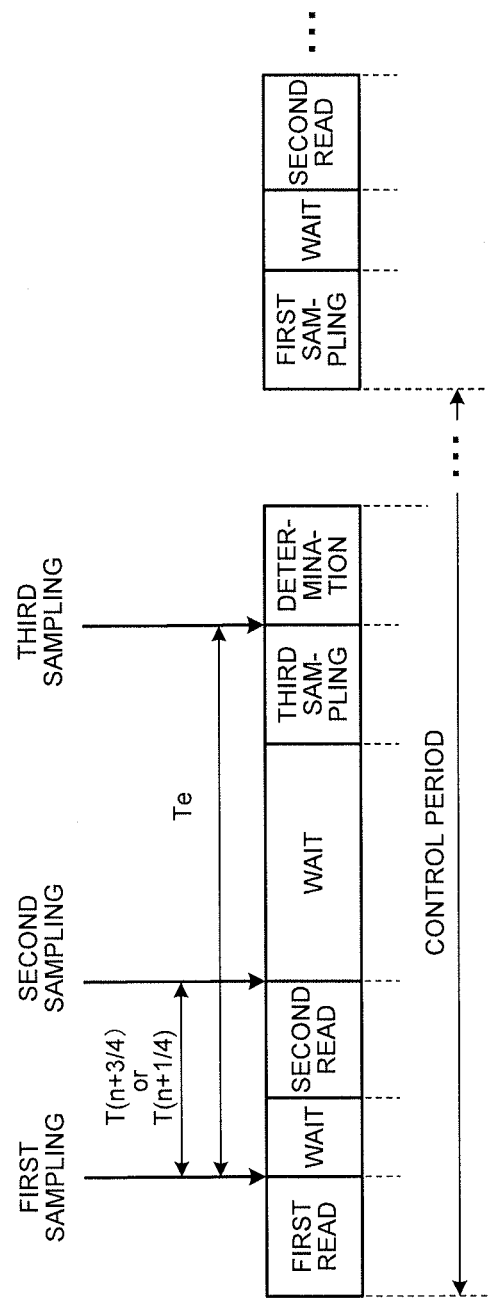
FIG. 6 is a diagram illustrating an example in which a sampling in the first embodiment is repeated with a control period.

After the third sampling is performed, the noise determination unit 33 determines whether all values acquired at the three samplings of the first to third samplings match one another (Step S15). If all of the values match one another (YES at Step S15), then it is determined that noise is not superimposed on the input data and the input data is adopted (Step S17). In other cases, that is, if any one of these values is different from other ones (NO at Step S15), then the input data is discarded (Step S16), and the process returns to Step S10. Then, three samplings are performed at control periods set in advance as illustrated in FIG. 6, the process is repeated until all of values acquired at the three samplings match one another. That is, the process is repeated until noise is not superimposed.

As described above, according to the noise determination device and the noise determination method of the present embodiment in an environment where periodic noise is generated, the presence of the effects of noise can be detected with a lower number of times of samplings, and the risk of erroneous input can be reduced. That is, the determination of the presence of noise on input data is performed with only three samplings, thus it is not required to perform samplings many times, and noise removal can be performed efficiently within a short time. Furthermore, in a case that samplings are performed in computation processing of a CPU or the like, operations can be handled at a low cost with slight changes in a circuit, an F/W, and the like. Further, it is possible to cause a CPU to perform other processes during a standby time between the second and third samplings, thereby improving operation efficiency.

Second Embodiment

Figure 7:
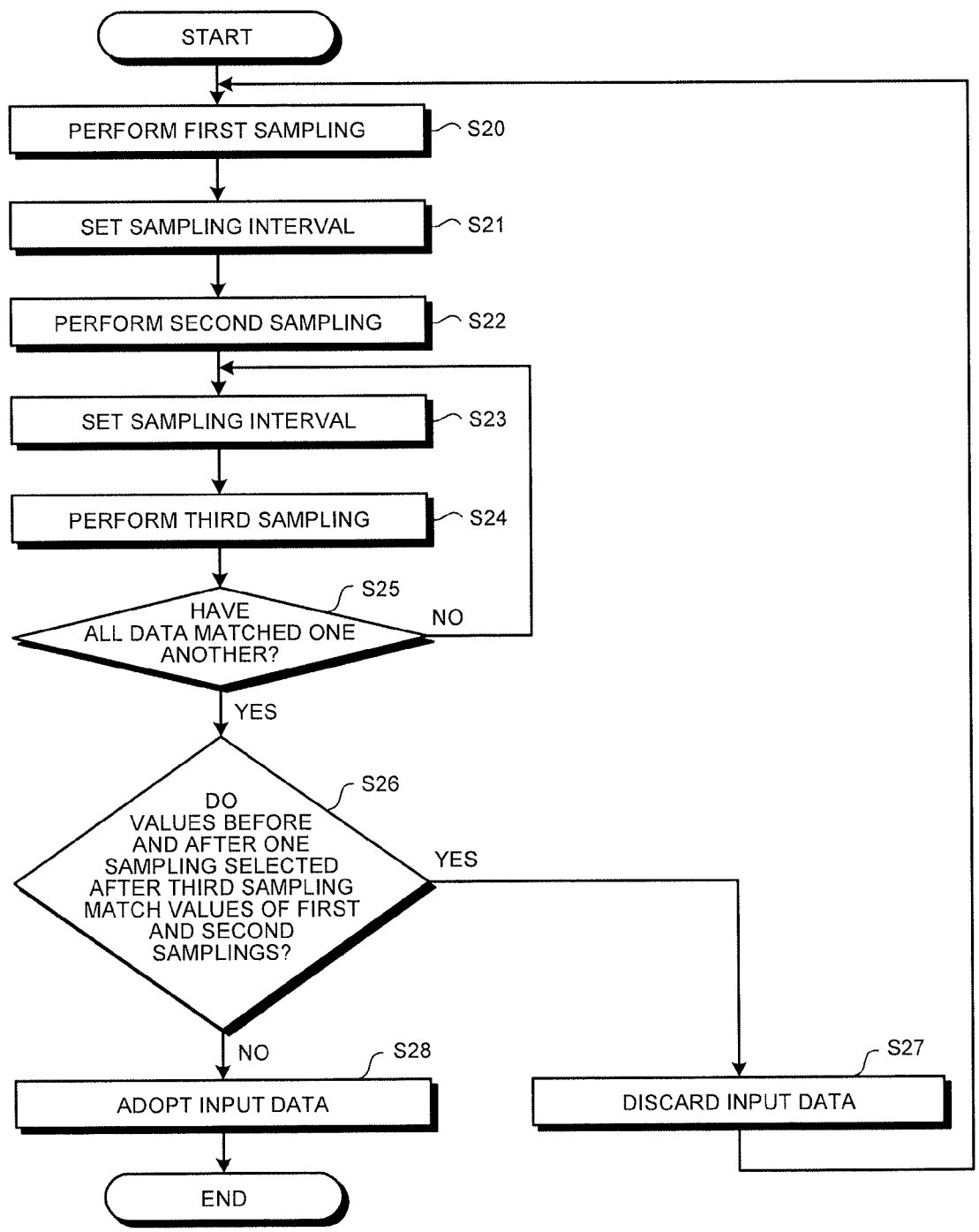
FIG. 7 is a flowchart illustrating a processing flow of a CPU unit according to a second embodiment.

In a second embodiment of the present embodiment, a case is described in an environment where the period of periodic noise superimposed on an input signal is unknown. The configuration of the programmable controller 10 according to the present embodiment is identical to those illustrated in FIGS. 1 and 2. A flow of processing performed by the CPU unit 300 according to the present embodiment is illustrated in a flowchart of FIG. 7.

First, the sampling unit 31 performs a first sampling (Step S20), and the sampling-interval setting unit 32 sets a sampling interval of a fixed time that is set in advance as an interval between the first sampling and a second sampling (Step S21), and the second sampling is performed (Step S22). Thereafter, an interval between the second sampling and a third sampling is set (Step S23), and the third sampling is performed (Step S24). At Step S23, a plurality of values different from each other are prepared in advance for the interval between the second and third samplings. Alternatively, these values can be a plurality of intervals to which a fixed time difference is respectively added. That is, the third sampling is performed multiple times. That is, at the third and subsequent samplings, samplings are repeated while their predetermined number of times and predetermined sampling timings are changed. At Step S25, the noise determination unit 33 determines whether all values acquired at the three samplings, which are the first sampling, the second sampling, and one sampling selected from samplings performed at the third and subsequent samplings, match one another. If the sampling value obtained at the third samplings performed multiple times matches the values of the first and second samplings (YES at Step S25), then the process proceeds to Step S26. If these values do not match one another (NO at Step S25), then the interval between the second and third samplings is set to have a different one (Step S23), and the third sampling is performed (Step S24). As for Steps S23, S24, and S25 in FIG. 7, details thereof are omitted in the descriptions in the drawing. If the value of the third sampling (the one after the third and subsequent samplings), for which the sampling interval from the second sampling has been changed, matches the values of the first and second samplings, then the sampling unit 31 performs subsequent samplings whose sampling intervals are fixed to the changed sampling interval.

Figure 8:
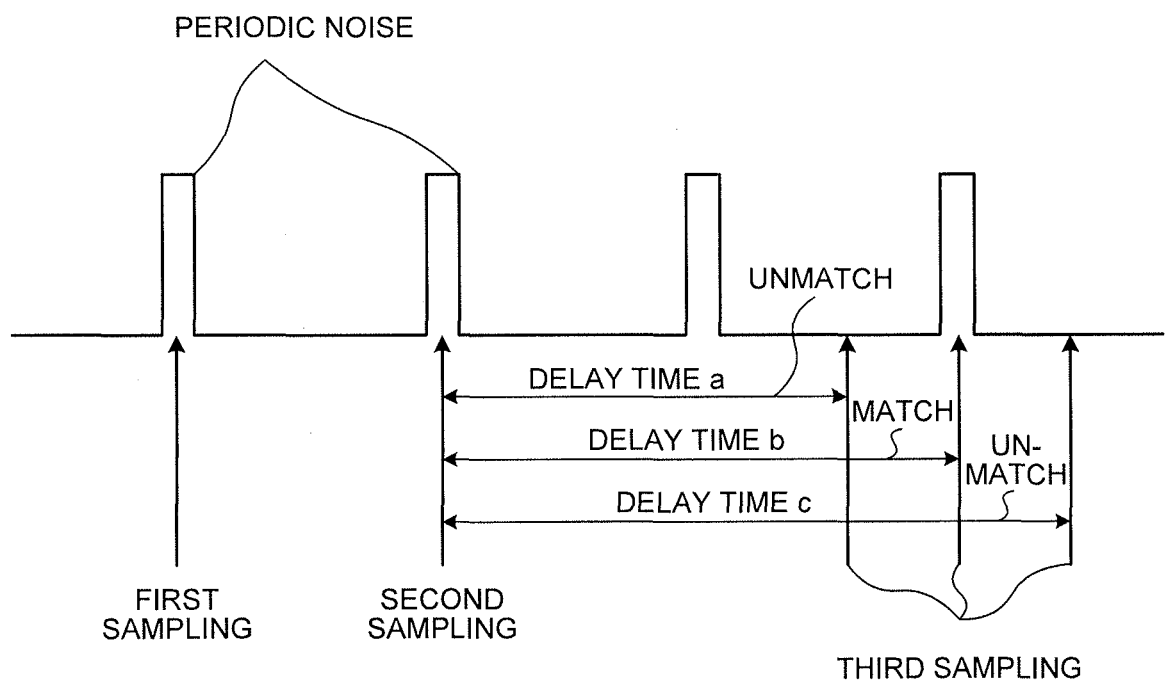
FIG. 8 is a diagram illustrating a state where, in the second embodiment, three samplings coincidentally match the period of periodic noise.

Even if the sampling value obtained at the third samplings performed multiple times matches the values of the first and second samplings (YES at Step S25), three samplings coincidentally may match the period of periodic noise as illustrated in a case of a delay time b of FIG. 8. In such a case, it is determined at Step S26 that periodic noise is superimposed on date, and this date is discarded.

That is, even when the values of the first and second samplings match the value of one sampling (the case of the delay time b) selected from samplings performed at the third and subsequent samplings, if values before and after the one sampling (cases of delay times a and c) are different from the values of the first and second samplings (YES at Step S26), then the noise determination unit 33 determines that noise is superimposed on an input signal, and input data of the signal is discarded (Step S27), and the process returns to Step S20. In this case, at Step S21, the interval between the first and second samplings is also changed from the fixed value described above. If at least one of the values before and after one sampling selected from samplings at the third and subsequent samplings matches the values of the first and second samplings (NO at Step S26), then it is determined that noise is not superimposed on an input signal, and input data of the signal is adopted (Step S28).

When the three samplings coincidentally match the period of periodic noise and thus all the values acquired at three samplings match one another, a method other than the method described above may be employed for determining that noise is superimposed on an input signal. For example, determination may be made based on whether the interval between the first and second samplings and the interval between the second and third samplings are in a relation with a ratio that is an integer.

As described above, according to the noise determination device and the noise determination method of the present embodiment, even when a period of periodic noise is unknown in an environment where the periodic noise is generated, the presence of the effects of noise can be determined with a lower number of samplings, and the risk of erroneous input can be reduced. That is, it is not required to perform samplings for many times, and thus noise removal can be performed efficiently within a short time. Furthermore, when samplings are performed in the computation processing of a CPU or the like, operations therefor can be handled at a low cost with slight changes in a circuit, an F/W, and the like.

Further, in the above embodiments, while a CPU unit of a programmable controller has been described as an example of the noise determination device, the present invention is not limited thereto, and the noise determination method according to the above embodiments can be applied to other devices.

Furthermore, the invention of the present application is not limited to the above embodiments, and when the present invention is carried out, the invention can be variously modified without departing from the scope thereof. Inventions of various stages are included in the above embodiments, and various inventions can be extracted by appropriately combining a plurality of constituent elements disclosed herein. For example, even when some constituent elements are omitted from all the constituent elements described in the embodiments, as far as the problems mentioned in the section of Solution to Problem can be solved and effects mentioned in the section of Advantageous Effects of Invention are obtained, the configuration from which these constituent elements are omitted can be extracted as an invention. In addition, constituent elements described in different embodiments can be appropriately combined.

INDUSTRIAL APPLICABILITY

As described above, the noise determination device according to the present invention is useful for determination of noise on a signal received from an input device of a programmable controller, and is particularly suitable as a digital I/O unit of a sequencer system.

REFERENCE SIGNS LIST 10 programmable controller, 31 sampling unit, 32 sampling-interval setting unit, 33 noise determination unit, 100 input device, 200 input unit, 300 CPU unit, S10 to S17, S20 to S28 step.

The invention claimed is:

1. A noise determination device that determines, in an environment where periodic noise is generated, presence of noise on an input signal having a constant value that is output from an external device, the noise determination device comprising:
   a sampling unit that performs three samplings on the input signal;
   a sampling-interval setting unit that sets an interval between a first one and a second one of the samplings to have a value that is different from an integral multiple of a period of the periodic noise, and sets an interval between the second one and a third one of the samplings to be equal to or larger than an interval that is large enough to fully attenuate the periodic noise; and
   a noise determination unit that determines that the noise is not superimposed on the input signal only when all values acquired by the first, second, and third samplings match one another.

2. A noise determination device that determines, in an environment where periodic noise is generated, presence of noise on an input signal with a constant value that is output from an external device, the noise determination device comprising:

a sampling unit that performs three samplings on the input signal;

a sampling-interval setting unit that sets an interval between a first one and a second one of the samplings have a first value that is different from an integral multiple of a period of the periodic noise, and sets an interval between the first one and a third one of the samplings to have a second value that is different from an integral multiple of the period and is larger than the first value, the second value being equal to or larger than an interval that is large enough to fully attenuate the periodic noise; and a noise determination unit that determines that the noise is not superimposed on the input signal only when all values acquired by the first, second, and third samplings match one another.

3. The noise determination device according to claim 1, wherein the sampling-interval setting unit sets the interval between the first and second samplings to have a value that is obtained by adding a value of one quarter of the period or three quarters of the period to an integral multiple of the period.

4. The noise determination device according to claim 2, wherein phases of the first value and the second value are different with respect to the period.

5. The noise determination device according to claim 2, wherein the sampling-interval setting unit sets the interval between the first and second samplings to have a value that is obtained by adding a value of one quarter or three quarters of the period to an integral multiple of the period.

\* \* \* \* \*